E. SCHNEIDER.
APPARATUS FOR SHIFTING TRAIL GUN CARRIAGES FOR THE PURPOSE OF TRAINING THE GUNS.
APPLICATION FILED MAR. 31, 1919.
1,326,975.
Patented Jan. 6, 1920.
6 SHEETS—SHEET 1.
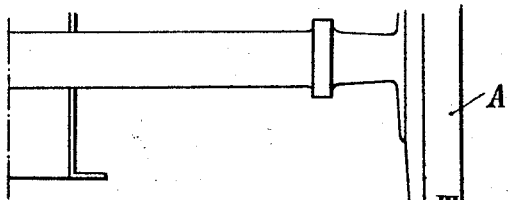
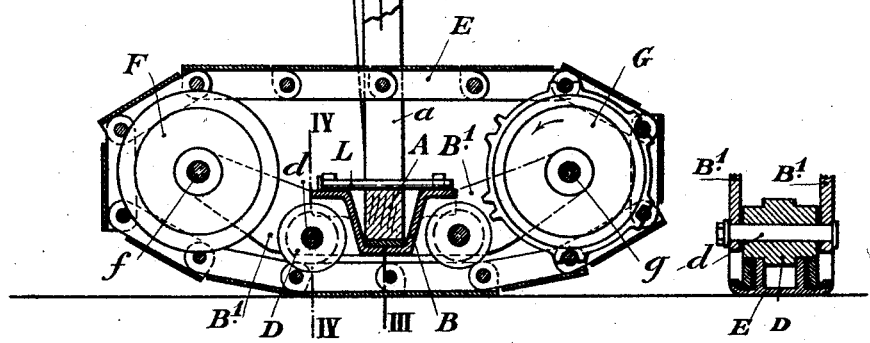
Fig. 2.
Fig. 4.
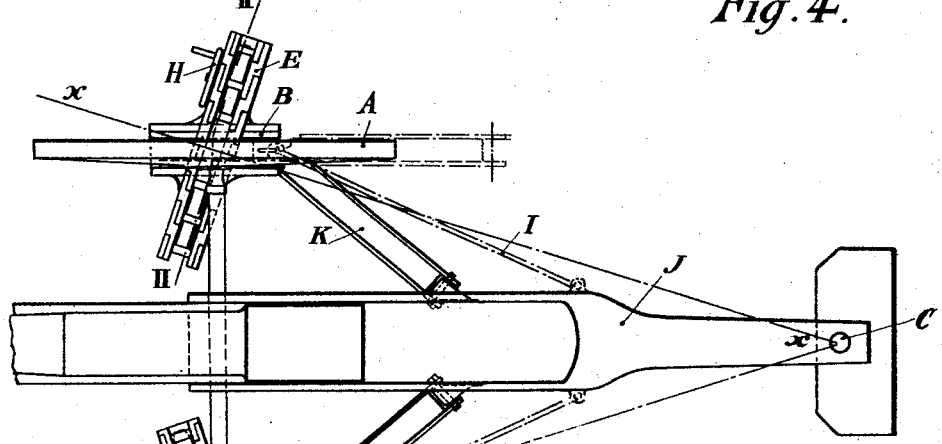
Fig. 1.
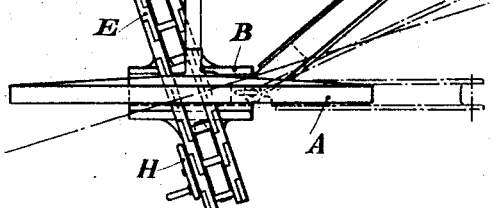

E. SCHNEIDER.
APPARATUS FOR SHIFTING TRAIL GUN CARRIAGES FOR THE PURPOSE OF TRAINING THE GUNS.
APPLICATION FILED MAR. 31, 1919.
1,326,975.
Patented Jan. 6, 1920.
6 SHEETS—SHEET 2.
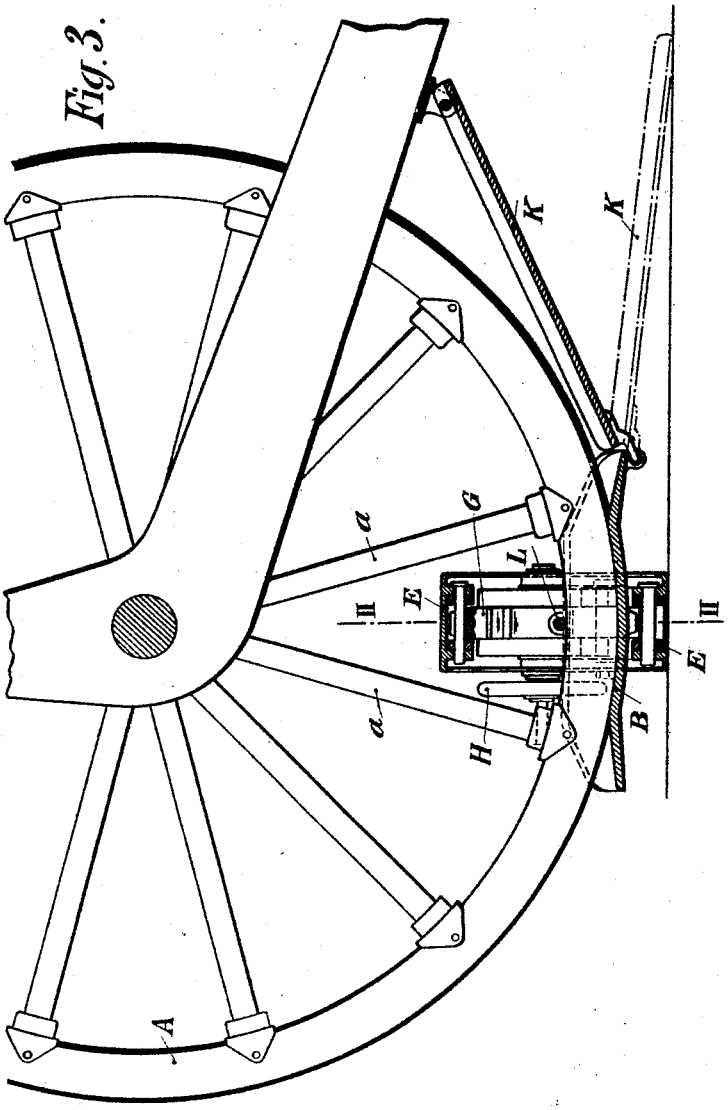

E. SCHNEIDER.
APPARATUS FOR SHIFTING TRAIL GUN CARRIAGES FOR THE PURPOSE OF TRAINING THE GUNS.
APPLICATION FILED MAR. 31, 1919.
1,326,975.
Patented Jan. 6, 1920.
6 SHEETS—SHEET 3.
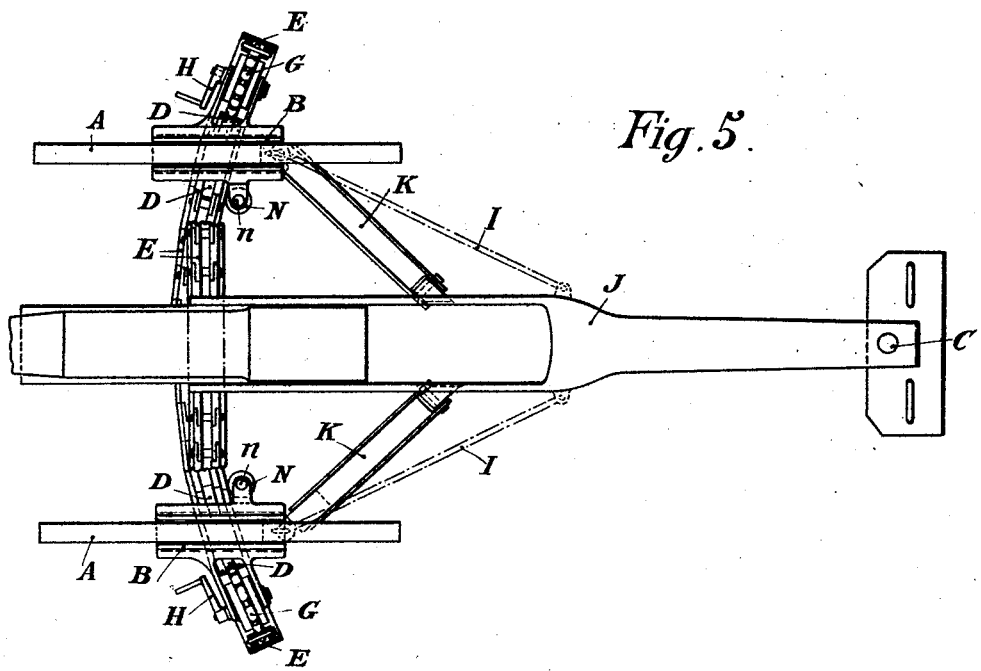
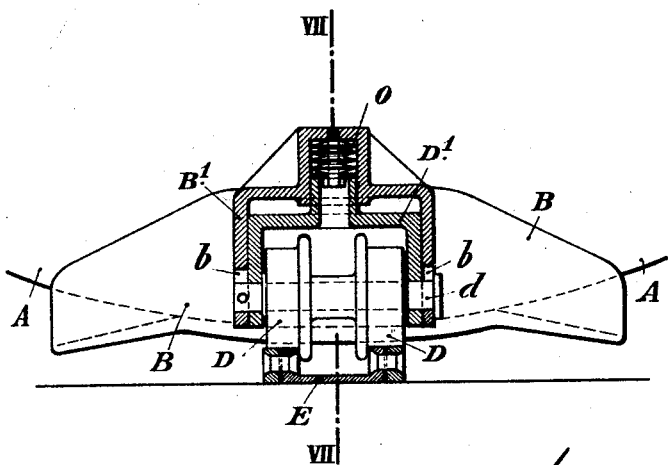

E. SCHNEIDER.
APPARATUS FOR SHIFTING TRAIL GUN CARRIAGES FOR THE PURPOSE OF TRAINING THE GUNS.
APPLICATION FILED MAR. 31, 1919.
1,326,975.
Patented Jan. 6, 1920.
6 SHEETS—SHEET 4.
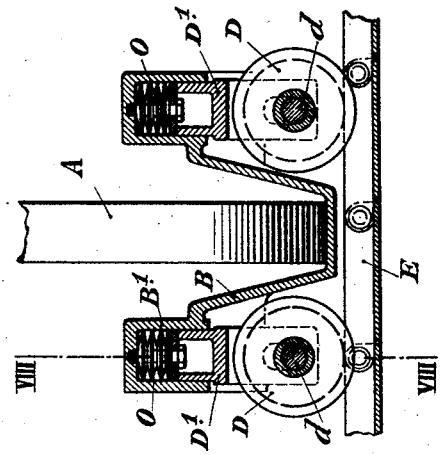
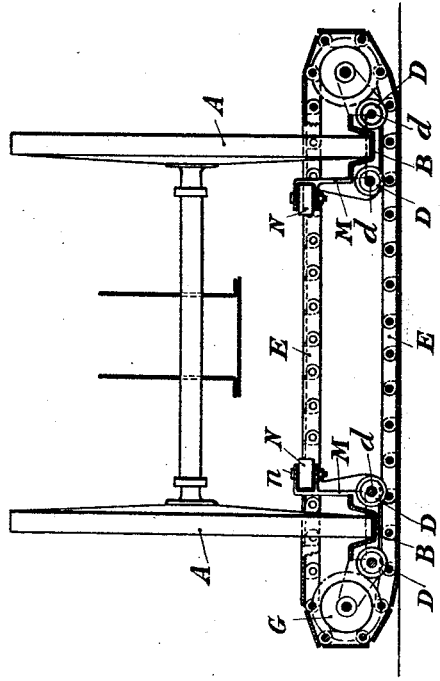

E. SCHNEIDER.
APPARATUS FOR SHIFTING TRAIL GUN CARRIAGES FOR THE PURPOSE OF TRAINING THE GUNS.
APPLICATION FILED MAR. 31, 1919.

1,326,975.

Patented Jan. 6, 1920.
6 SHEETS—SHEET 5.

E. SCHNEIDER.
APPARATUS FOR SHIFTING TRAIL GUN CARRIAGES FOR THE PURPOSE OF TRAINING THE GUNS.
APPLICATION FILED MAR. 31, 1919.
1,326,975.
Patented Jan. 6, 1920.
6 SHEETS—SHEET 6.
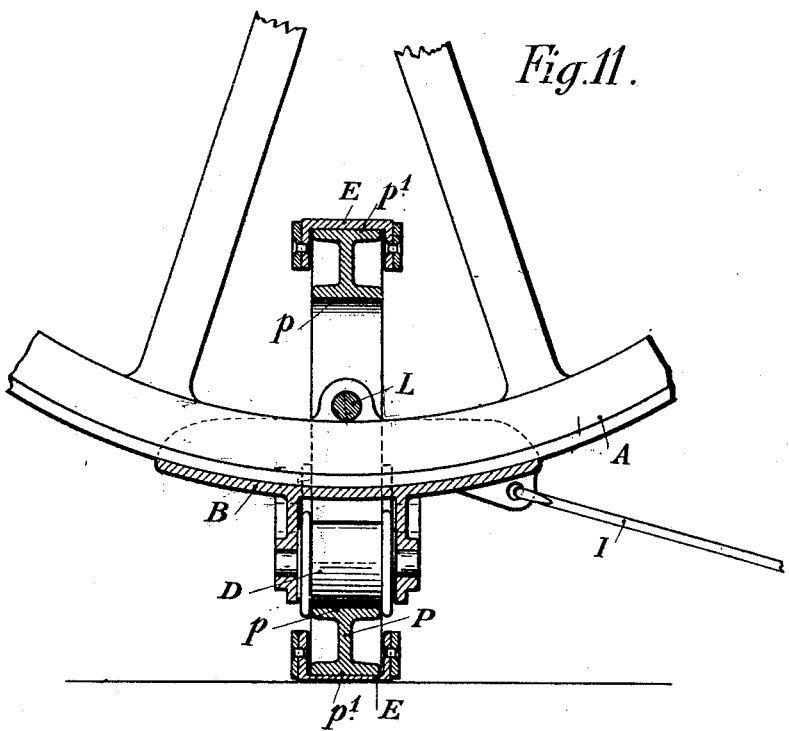

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

APPARATUS FOR SHIFTING TRAIL GUN-CARRIAGES FOR THE PURPOSE OF TRAINING THE GUNS.

1,326,975.  Specification of Letters Patent.  Patented Jan. 6, 1920.

Application filed March 31, 1919. Serial No. 286,493.

*To all whom it may concern:*

Be it known that I, EUGÈNE SCHNEIDER, citizen of the French Republic, and a resident of 42, Rue d'Anjou, Paris, France, have invented a new and useful Improved Apparatus for Shifting Trail Gun-Carriages for the Purpose of Training the Guns, which invention is fully set forth in the following specification.

This invention has for its object to provide an improved apparatus for facilitating the shifting of trail gun carriages for the purpose of training the guns.

This improved apparatus consists substantially in a supporting truck for each of the wheels of the wheeled axle of the gun carriage.

This supporting truck rests in its turn by means of devices such as rollers upon an endless chain whose guiding and driving wheels it carries. The lower stretch of this endless chain remains on the ground while its upper stretch is engaged between two spokes of the gun carriage wheels.

The rollers for the supporting trucks and the guiding and driving wheels for the endless chains have, relatively to the support proper constituted by the truck body on which the gun carriage wheel rests, a direction such that the chains or chain elements by means of which the gun carriage rests indirectly upon the ground, are arranged approximately along the chord of an arc having for its center the point of support of the gun carriage trail; these chords being at right angles to the radius passing through the point of support of the respective wheel.

Some constructional examples of the invention are illustrated in the accompanying drawings in which:—

Figure 1 is a plan of a trail gun carriage embodying the present improvements;

Fig. 2 is a detail vertical section, partly in elevation, on the line II—II of Fig. 1 and Fig. 3;

Fig. 3 is a section on the line III—III of Fig. 2;

Fig. 4 is a section on the line IV—IV of Fig. 2;

Fig. 5 is a plan view of a modification of the invention;

Fig. 6 is a side elevation of the same;

Fig. 7 is a longitudinal sectional view of another modification;

Fig. 8 is a sectional view on the line VIII—VIII of Fig. 7;

Fig. 11 is a transverse sectional view on the line XI—XI of Fig. 9.

Figure 9:
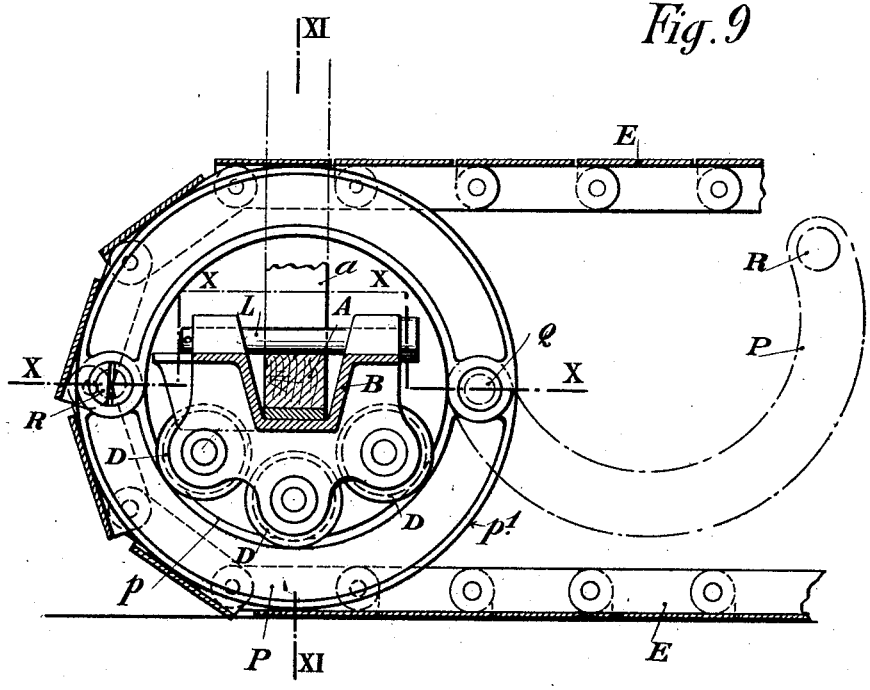
Fig. 9 is an elevation, partly in section, of a further modification of the invention, the section being taken on the line IX—IX of Fig. 10.

Referring particularly to Figs. 1 and 4, each of the gun carriage wheels A rests on a truck comprising a channel-shaped supporting member B. Obliquely to the latter in a plane situated along a chord of an arc having for its center the point of support C of the gun carriage trail, and being at right angles to the radius $x$—$x$ passing through the point of support of the respective wheel, the truck comprises side pieces or arms $B^1$ carrying axle pins $d$ for supporting rollers D. By means of these rollers the truck rests upon an endless chain E. The side pieces $B^1$ also carry an axle pin $f$ for a guiding wheel F for the chain and an axle pin $g$ for a driving wheel G for the said chain. An operating handwheel H is mounted on the axle pin $g$. The lower stretch of each of the chains E rests upon the ground, while the upper stretch passes between two spokes $a$ of the respective carriage wheel A.

For the purpose of firmly connecting together the gun carriage and the separate supports constituted by the endless chains E that run over the trucks B, removable ties are provided between the channel members and the trail. These ties may consist of mere rods I such as those indicated in dot-and-dash lines in Fig. 1, jointed at one end to the trail J and at their other ends to the channel-members B. These ties I assure a firm connection between the trucks and the gun carriage in the movements of the latter for training or during the firing. These removable ties are preferably constituted as shown in Figs. 1 and 3, by a channel member K which when let down on to the ground and being then jointed only to the channel member B, can be placed in prolongation of the latter (position indicated in dot-and-dash lines in Fig. 1). In this position the said tie K forms in combination with the channel member B an inclined plane for bringing the respective gun carriage wheel A into position. On the other hand, for the purpose of firmly connecting together the gun carriage and the supports in the movements for raising the gun carriage wheels each truck comprises a retaining device such as a removable pin L; the felly of the wheel being held between this pin and the bottom of the channel-member B.

To place the described supports into position for running out the gun for firing, the endless chains E are laid upon the ground and the channel members B are placed parallel to the "distance between" the gun carriage wheels A. The ties K are connected to the channel members B and then placed in prolongation of the latter. The gun carriage can then be rolled on the inclined planes.

When the gun carriage wheels have been engaged in the channel members B, the endless chains E are closed after their upper stretches have been placed around the guiding wheels F and driving wheels G. Then the retaining pins L are inserted, and the ties K are placed in the position shown in full lines in Figs. 1 and 3.

To shift the gun carriage for the purpose of altering the training direction, it is merely necessary to actuate the handwheel H.

In the example shown in Figs. 5 and 6 the supporting trucks for the two gun carriage wheels rest on a common endless chain E. Each truck carries in this case a driving wheel G. It also carries on the inner side a bracket M for the axle pin n of a roller N that serves as a lateral support for the upper stretch of the chain.

The common chain E may be composed of suitable members and have a length such as will allow of its being placed for transport purposes around one of the gun carriage wheels A after the manner of the usual non-skid bands. Of course a second exactly similar chain is to be provided for the other wheel A.

The axle pins $d$ of the rollers D by means of which the supporting trucks rest on the chains E, may, instead of being carried by the side pieces $B^1$, be supported by a forked bearing member $D^1$ as shown in Figs. 7 and 8, in such a manner that the ends of the pins $d$ can have a limited freedom of motion in the slots $b$ of the side pieces $B^1$ of the channel member B. Piles of Belleville washers O placed between the side pieces $B^1$ and the forked bearing members $D^1$, provide an elastic suspension for the channel members B on the said forked bearing members. The strains due to the firing, instead of being transmitted to the chain through the points of contact of the rollers D, are transmitted through bottom of the channel members B which comes in contact with the lower stretch of the chain, after compression of the springs O.

Figure 10:
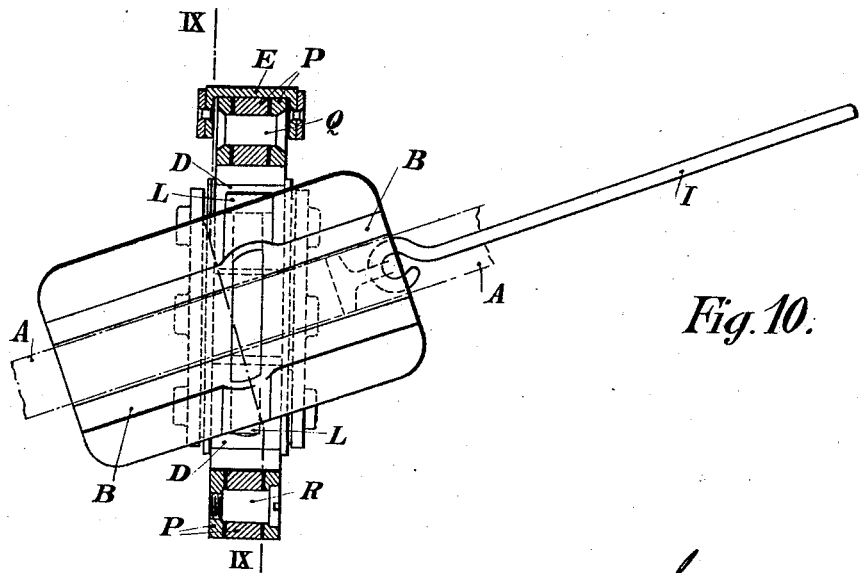
Fig. 10 is a horizontal sectional view on the line X—X of Fig. 9.

In the example shown in Figs. 9, 10 and 11 the trucks, instead of being supported directly on the endless chain, are here supported by means of rollers D upon the inner surface $p$ of a ring P, around the outer surface $p^1$ of which the endless chain E passes. The ring P is made in two parts connected together by two pins Q and R of which the pin R is removable so as to allow of turning the top half of the ring down into the position indicated in dot-and-dash lines in Fig. 9 for the purpose of inserting the truck. The ring P thus serves as a guide wheel for the endless chain. The shifting of the gun carriage for the purpose of altering the training of the gun, can be effected in this modification by simply pushing or pulling the carriage by means of its wheel A.

What I claim is:—

1. The combination of a gun-mounting including carriage-wheels and a trail, with a training apparatus comprising a truck to support each carriage-wheel with the truck operatively positioned to travel the chord of an arc centered at the pivotal point of the trail-tail, and an endless track passing beneath the truck and over the rim of the carriage-wheel supported by the truck when the training apparatus is in operative position.

2. The combination of a gun-mounting including carriage-wheels and a trail, with a training apparatus comprising a channel-shaped member to receive each carriage-wheel, a truck carrying the channel-shaped member and extending obliquely to the plane of the carriage-wheel to travel the chord of an arc centered at the pivotal point of the trail-tail, and an endless track passing beneath the truck and over the rim of the carriage-wheel seated in the channel-shaped member.

3. The combination of a gun-mounting including carriage-wheels and a trail, with a training apparatus comprising a channel-shaped member to receive each carriage-wheel, a truck carrying the channel-shaped member and extending obliquely to the plane of the carriage-wheel to travel the chord of an arc centered at the pivotal point of the trail-tail, a pin extending through the channel-shaped member over the rim of the carriage-wheel seated in said member, and an endless track passing beneath the truck and over the rim of the carriage-wheel seated in the channel-shaped member.

4. The combination of a gun-mounting including carriage-wheels and a trail, with a training apparatus comprising a truck to support each carriage-wheel with the truck operatively positioned to travel the chord of an arc centered at the pivotal point of the trail-tail, a tie connecting the truck with the trail, and an endless track passing beneath the truck and over the rim of the carriage-wheel supported by the truck when the training apparatus is in operative position.

5. The combination of a gun-mounting including carriage-wheels and a trail, with a training apparatus comprising a channel-shaped member to receive each carriage-wheel, a channeled tie jointed to the channel-shaped member and detachably connected to the trail, a truck carrying the channel-shaped member and extending obliquely to the plane of the carriage-wheel to travel the chord of an arc centered at the pivotal point of the trail-tail, and an endless track passing beneath the truck and over the rim of the carriage-wheel seated in the channel-shaped member.

In testimony whereof I have signed this specification.

EUGÈNE SCHNEIDER.